United States Patent [19]

English

[11] 4,149,490
[45] Apr. 17, 1979

[54] POULTRY WATERING METHOD

[76] Inventor: Ernest W. English, P.O. Box 2, Willard, N.C. 28478

[21] Appl. No.: 759,186

[22] Filed: Jan. 13, 1977

[51] Int. Cl.² ............................................. A01K 39/02
[52] U.S. Cl. ................................................... 119/72
[58] Field of Search .................. 119/72, 73, 74, 77, 119/78, 79, 80; 261/77

[56] References Cited

U.S. PATENT DOCUMENTS

| 1,481,365 | 1/1924 | Hegel | 119/74 |
| 2,844,912 | 7/1958 | Sebesta | 119/5 X |
| 2,995,110 | 8/1961 | Wiley | 119/61 |
| 3,675,627 | 7/1972 | Myers | 119/72 |
| 3,817,500 | 6/1974 | Cooper | 261/77 |

Primary Examiner—Hugh R. Chamblee

[57] ABSTRACT

Improved poultry watering apparatus and an improved method of causing the birds to water effectively is described. The principle of operation is to provide means for bubbling small jets of air bubbles through the watering basin or reservoir to create the sound of gurgling or bubbling water. The combined sight and sound of the moving, bubbling water surface has been found to provide very great attractive powers to all sorts of poultry and, in particular, to turkeys, causing them to water steadily and effectively for proper weight and growth performance.

4 Claims, 6 Drawing Figures

POULTRY WATERING METHOD

FIELD OF THE INVENTION

This invention relates to poultry watering apparatus and methods in general and, in particular, to improved watering apparatus and techniques for watering recalcitrant or reluctant fowl such as turkeys.

PRIOR ART

A wide variety of prior fowl watering devices exists in the prior art. The well-known inverted water jars, water troughs, pans, etc., have long been in use. More sophisticated watering reservoirs have also been produced in which spring-loaded valves are utilized with suspended water containers to provide a self-filling and regulating water supply permanently connected to a water pipe or other source of continuous supply.

In all of the foregoing prior art devices, however, mere provision of a supply of water has been found insufficient to entice some birds to drink and, in particular, turkeys have been notoriously difficult to train to drink from the known watering devices.

OBJECTS OF THE INVENTION

In light of the relative ineffectiveness of prior art devices to achieve proper watering of turkeys in particular, it is an object of this invention to provide an improved poultry watering apparatus which entices the fowl to drink without training or coercion.

Yet another object of this invention is to provide an improved method of causing fowl to drink and, in particular, for causing turkeys to drink effectively and properly.

SUMMARY

The foregoing and other objects of the invention are met by providing in an ordinary watering device of the trough or bell-shaped reservoir type or any other suitable container, a supply of compressed air in an apertured feed tube lying at the bottom of the reservoir which releases or injects streams of bubbles through the apertures therein and into the water in the reservoir. The bubbles rise to the surface of the water and burst, thereby creating a gurgling sound and gently rippling effect on the surface of the water in the reservoir. Fowl in general and turkeys in particular, which are notoriously difficult to train to drink properly, are greatly attracted by the sight and the sound of the gurgling, bubbling water and drink readily and fully to their requisite amount without training or coercion.

The techniques and apparatus envisioned in the present invention will now be described with reference to several preferred embodiments illustrated and more fully described with reference to the following drawings in which:

DETAILED SPECIFICATONS

Figure 1A:
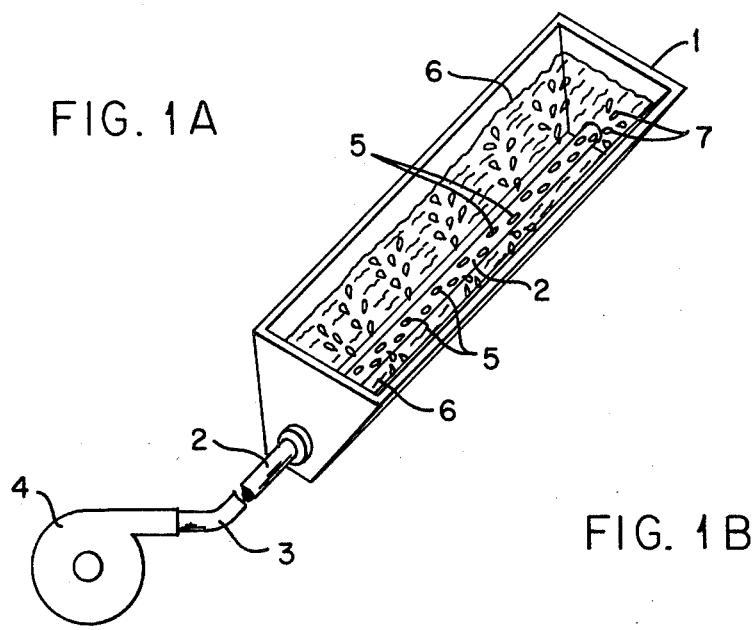
FIG. 1A illustrates an oblique pictorial view of a conventional watering trough fitted with the improved bubble producing means of the present invention.
Figure 1B:
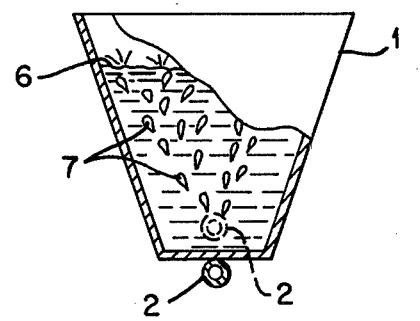
FIG. 1B is a cross-sectional end view of the apparatus shown in FIG. 1A.

Turning to FIG. 1A, a typical trapezoidal or triangular cross section, poultry watering trough 1 is illustrated. These troughs are well known in the poultry industry and generally constructed of galvanized sheet metal, of plastic or even of wood. The specific material for manufacturing trough 1 is of no particular consequence in the present invention. Trough 1 is provided with an air inlet tube 2 affixed along its bottom surface or passing through an end wall, in the alternative, as shown in FIG. 1B. The air supply tube 2 is provided with numerous small apertures 5 through which air under pressure is injected or allowed to escape in the pool of water 6 forming bubbles 7 as shown in FIG. 1B. As bubbles 7 rise in the pool 6, they will cause agitation and an gurgling sound to be produced at the surface of the water, thus attracting the birds and, in particular, turkeys, to drink their fill and progress properly toward maturity.

In FIG. 1A, the air supply tube 2 is affixed to an air supply hose 3 connected to an air pump 4. Tube 2 and air supply hose 3 may be made of rubber, metal, vinyl plastic, urethane or any of a variety of commercially available solvent-resistant tubing materials. In the preferred embodiment, a clear vinyl tubing was utilized for the air supply hose 3 and for the air supply tube 2. Pump 4 is the typical aquarium air supply pump well known to hobbyist and professionals alike for supplying air to tropical and other types of marine life living in an aquarium. An air flow of approximately one cubic foot per minute is sufficient for supplying an adequate number of bubbles to produce the desired agitation and gurgling sound in a supply trough 1 of four to six feet in length. Higher or lower air volumes can easily be accommodated depending upon the size or the reservoir and the volume of water to be agitated. It should generally be understood that the air flow should be limited by suitable valve means (not shown) in the event that an oversupply or overpressure of compressed air exists which would cause splashing or significant loss of water from the trough as will be appreciated by those of skill in the art.

Inasmuch as the details of a suitable air supply pump 4 are well known in the prior art and do not form a part of the present invention, further description of an air supply pump 4 will be omitted, it being well understood that a variety of air pump means may be utilized.

Figure 2A:
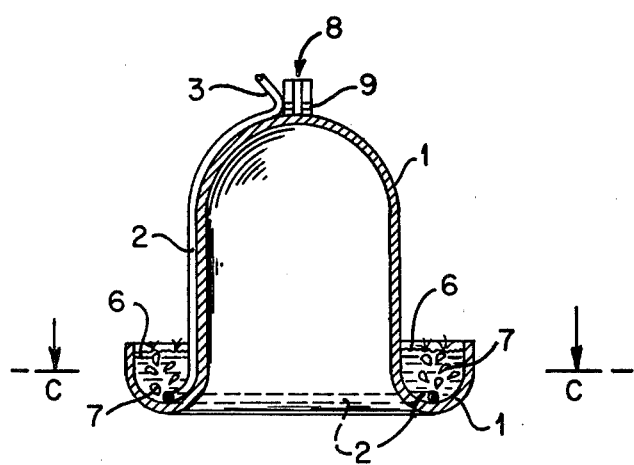
FIG. 2A is a vertical cross section taken through a bell-shaped, hat-shaped, dome-shaped, or similar typically available, automatic-filling, poultry watering device used in the prior art and outfitted with the improved air bubbling supply tubes of the present invention.

Turning to FIG. 2A, another embodiment of a poultry watering device outfitted with the sound and agitation producing means of the present invention is illustrated. In FIG. 2A a typical prior art bell-, dome-, or hat-shaped water reservoir 1 is illustrated to the side of which air supply tube 2 is affixed to run down the side wall and into the reservoir portion at the bottom of the bell shape as shown. The air supply hose 3 is schematically shown connected to the upper end of the air supply tube 2. Tube 2 has numerous apertures 5 (not shown) to inject or release bubbles 7 into the body of water 6 contained in the reservoir portion of watering means 1. The specific prior art watering device 1 shown in FIG. 2A is provided with a water inlet 8 and a weight control spring-loaded valve means (not shown) which allows water to flow through apertures 9 and down the outside surface of the bell shape to maintain reservoir water level 6 at an adequate height. Water is continuously supplied under pressure to the valve through the inlet tube 8 and, when the weight of the water in the reservoir drops far enough, tension from a spring (not shown) raises the overall apparatus, opens the valve and allows sufficient water to flow through tube 8 and out apertures 9 to refill the reservoir, weighting it down and again closing the valve.

The air supply tube 2 encircles the center portion or dome of the bell-shaped reservoir as will be more clearly understood in the following description.

Figure 2B:
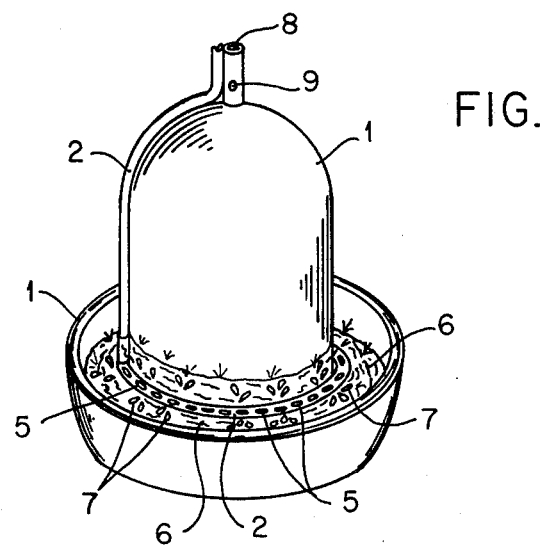
FIG. 2B is a side elevational view of the apparatus in FIG. 2A viewed from a point above the rim of the water reservoir.

Turning to FIG. 2B, an overall pictorial view of the apparatus shown in FIG. 2A is illustrated from a side elevational vantage point. Apertures 5 are illustrated as being in the bottom surface of reservoir 1 with tube 2 lying beneath the surface and affixed to the bottom of the bell-shaped structure, an alternative arrangement to that shown in FIG. 2A, but one which will be obvious to those of skill in the art. Tube 2, with apertures 5, may be integrally molded into the bell- or dome-shaped reservoir 1 which may be conveniently made of plastic or other similar easily moldable material. For the embodiment shown in FIG. 2A, the tube 2 may be affixed to the bottom interior surface or to the exterior surface on the bottom edge of reservoir 1 using suitable adhesive and sealing compounds to prevent the escape of water in the event that tube 2 is cemented to the bottom edge on the outside of reservoir 1.

Figure 2C:
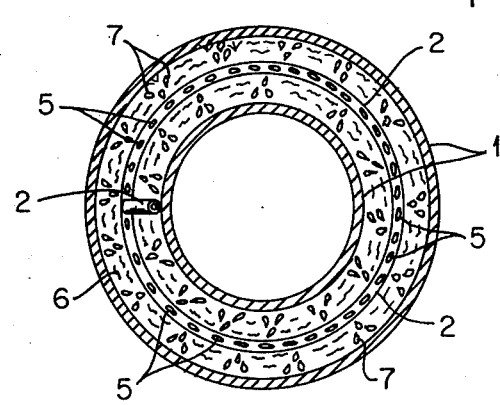
FIG. 2C is a horizontal section taken through the apparatus as shown in FIG. 2A in the direction of the section arrows CC.

FIG. 2C illustrates a cross-sectional plan view taken along line CC in FIG. 2A and shows the alternative type of construction alluded to with reference to FIG. 2B in which supply tube 2 is integrally molded with reservoir 1 in the bottom area of the trough or channel in which the water is contained. Apertures 5 may then be molded directly through the wall of tube 2 and an air inlet tube fixture 2A can be provided to admit air to the circular air supply tube channel 2.

Figure 2D:
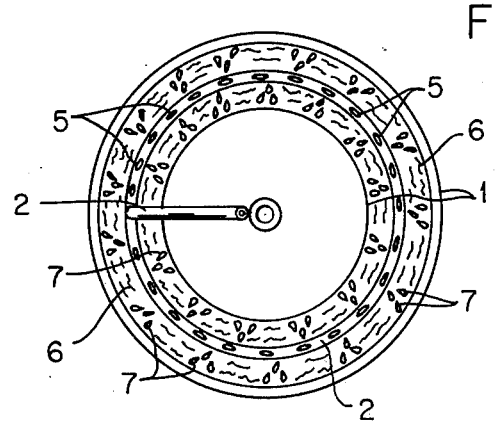
FIG. 2D is a top plan view of the apparatus shown in FIG. 2A.

Turning to FIG. 2D, a top plan view of the apparatus as shown in FIG. 2A is illustrated in which it may be seen that tube 2 can be affixed either to the inner or to the outer bottom surface of reservoir 1 or molded in place either on the inner or the outer surface as desired. In all of the structures so far described, it will be clearly understood that the air supply means will be a tube or other generally impervious walled conduit through which air under slight pressure can be pumped by suitable pump and supply means this air may be allowed to exit the supply tube into the reservoir of water through numerous apertures to create a bubbling and gurgling action on the surface of the water which is visible and audible to the poultry as desired according to the present invention.

Advantages

It has been found that the method of the present invention, namely causing a bubbling and gurgling action and sound of water on the surface of a poultry watering reservoir by means of an injected stream or streams of air bubbles, is a most effective and inexpensive manner of obtaining prompt watering by the most recalcitrant birds, and of turkeys, in particular. Consistently improved weight gain records may be demonstrated for all of the turkey species watered using this method and apparatus.

It will also be apparent that the improved apparatus of the present invention comprising a source of air under pressure, an air supply tube with apertures therein for injecting or bubbling air into the reservoir and a suitable reservoir for water is an inexpensive and easily constructed device. Existing watering troughs, reserviors, etc., can be easily outfitted with apparatus for achieving the present invention by providing an air supply pump, hose connections and flexible apertured tube to lie in the bottom of the reservoir to create the desired bubbling and gurgling action.

In light of the foregoing description of the invention with relation to several preferred embodiments thereof, what is desired to be protected by letters patent is.

I claim:

1. An improved method of watering poultry using a water reservoir comprising steps of:
   filling a reservoir with water;
   injecting at least one stream of compressed air into said water reservoir at a point beneath the surface of the water to create a stream of air bubbles therein; and
   exposing the surface of the water reservoir in the vicinity of the point where said rising bubbles burst so that the poultry may see and hear the gurgling and bubbling action produced by the stream of bubbles.

2. A method as described in claim 1, wherein:
   said injecting of compressed air is performed at a plurality of locations beneath the surface of said water forming a plurality of bubble streams in said reservoir to generally agitate the surface of the water therein.

3. An improved method of watering poultry using a water reservoir for holding a supply of water to be fed to the poultry comprising steps of:
   creating a continuous bubbling agitation of the surface of said water and a gurgling sound at the surface of said water by injecting a stream of compressed air continuously into said water at a point beneath the surface thereof to create a stream of air bubbles therein; and
   exposing the surface of said water in the vicinity of said bubbling agitation and gurgling sound so that the poultry may see and hear the gurgling and bubbling action at the surface thereof.

4. The method as described in claim 3, further comprising the step of:
   injecting said compressed air at a plurality of locations beneath the surface of said water.

* * * * *